US009489110B2

(12) United States Patent
Malhotra et al.

(10) Patent No.: US 9,489,110 B2
(45) Date of Patent: Nov. 8, 2016

(54) AUTOMATIC DEPLOYMENT, CONFIGURATION, AND LIFECYCLE MANAGEMENT OF APPLICATIONS AND INFRASTRUCTURE COMPONENTS

(71) Applicant: Bank of America Corporation, Charlotte, NC (US)

(72) Inventors: Sameer Malhotra, Short Hills, NJ (US); Jooi-Teong Chuah, East Brunswick, NJ (US); Nazario Parsacala, Piscataway, NJ (US); Kanishka Hettiarachchi, Hoboken, NJ (US); Rejith Kurup, Morganville, NJ (US)

(73) Assignee: Bank of America Corporation, Charlotte, NC (US)

(*) Notice: Subject to any disclaimer, the term of this patent is extended or adjusted under 35 U.S.C. 154(b) by 434 days.

(21) Appl. No.: 13/662,859

(22) Filed: Oct. 29, 2012

(65) Prior Publication Data

US 2014/0122666 A1    May 1, 2014

(51) Int. Cl.
*H04L 12/24* (2006.01)
*G06F 3/0484* (2013.01)
*G06F 9/445* (2006.01)
*G06F 3/0482* (2013.01)

(52) U.S. Cl.
CPC ......... *G06F 3/04842* (2013.01); *G06F 3/0482* (2013.01); *G06F 8/60* (2013.01); *G06F 8/61* (2013.01)

(58) Field of Classification Search
CPC ............. H04L 41/0803; H04L 41/084; H04L 41/0853; H04L 67/1014; G06F 9/466; G06F 3/0607; G06F 9/63; G06F 9/0483
USPC ........................ 709/203, 220, 222, 223, 224
See application file for complete search history.

(56) References Cited

U.S. PATENT DOCUMENTS

| | | | |
|---|---|---|---|
| 5,461,710 A * | 10/1995 | Bloomfield | G06F 3/0483 715/775 |
| 7,134,122 B1 | 11/2006 | Sero et al. | |
| 7,206,817 B2 | 4/2007 | Fanshier et al. | |
| 7,512,942 B2 | 3/2009 | Brown et al. | |
| 7,890,543 B2 | 2/2011 | Hunt et al. | |
| 2003/0158920 A1 * | 8/2003 | Lynch | G06F 3/0607 709/220 |
| 2003/0233571 A1 * | 12/2003 | Kraus | G06F 9/466 726/15 |
| 2005/0160159 A1 * | 7/2005 | Zimmer | G06F 15/177 709/223 |
| 2010/0205594 A1 * | 8/2010 | Jirka | G06F 8/63 717/170 |

* cited by examiner

*Primary Examiner* — Barbara Burgess
(74) *Attorney, Agent, or Firm* — Banner & Witcoff, Ltd.; Michael A. Springs (57) ABSTRACT

Apparatuses, computer readable media, methods, and systems are described for automatic deployment of applications and infrastructure components, which may include processing selection of an operating system, processing selection of a stack, creating a stencil based on the operating system and the stack, and publishing the stencil.

17 Claims, 11 Drawing Sheets

AUTOMATIC DEPLOYMENT, CONFIGURATION, AND LIFECYCLE MANAGEMENT OF APPLICATIONS AND INFRASTRUCTURE COMPONENTS

BACKGROUND

Applications have been developed to perform tasks using software programs. A server may be a physical computer running to serve the requests of at least one other program. Deploying of applications and setting up servers can be intensive of time and resources of information technology staff. In view of such issues, improvements in deployment and management of application lifecycle are needed.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

In some aspects, apparatuses, computer readable media, methods, and systems are described for automatic deployment of applications and infrastructure components, which may include processing a selection of an operating system. A selection of a stack may be processed. A stencil based on the operating system and the stack may be created. The created stencil may then be published.

In some additional aspects, apparatuses, computer readable media, methods, and systems are described for automatic deployment of applications and infrastructure components, which may include processing selection of an operating system. An element may be generated that includes a selection of one of a plurality of types. A selection for a stack comprising the element may be processed. A stencil may be created based on the operating system and the stack. The created stencil may then be published.

Aspects of the embodiments may be provided in at least one non-transitory computer-readable medium and/or memory storing computer-executable instructions that, when executed by at least one processor, cause a computer or other apparatus to perform one or more of the process steps described herein.

These and other aspects of the embodiments are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Figure 1:
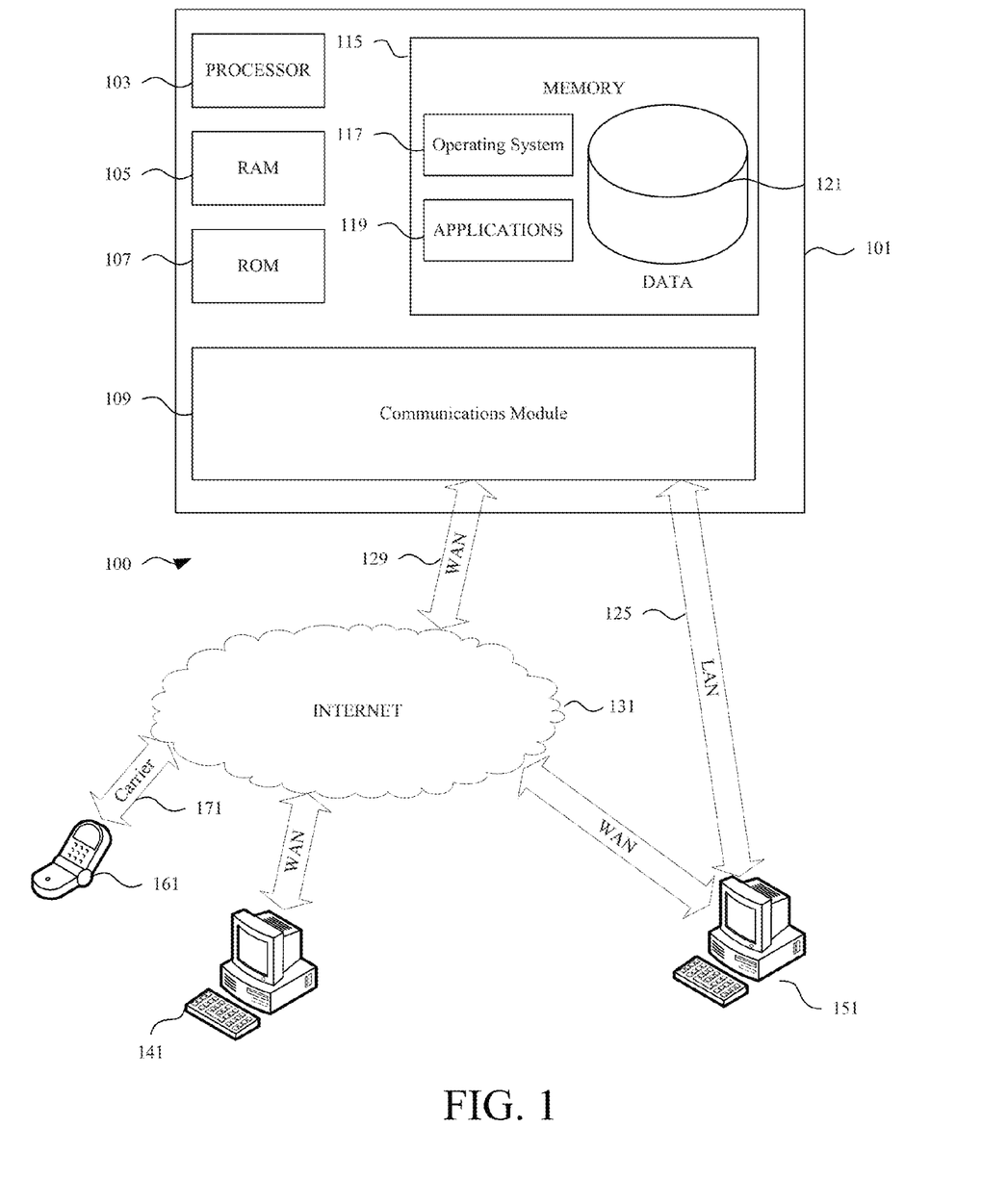
FIG. 1 depicts an illustrative operating environment in which various aspects of the present disclosure may be implemented in accordance with example embodiments.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

With reference to FIG. 1, the computing system environment 100 may include a computing device 101 having a processor 103 for controlling overall operation of the computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Also, some or all of the computer executable instructions for computing device 101 may be embodied in hardware or firmware. Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device (e.g., smart phone) communicating over wireless carrier channel 171.

The network connections depicted in FIG. 1 may include a local area network (LAN) 125 and a wide area network (WAN) 129, as well as other networks. When used in a LAN networking environment, computing device 101 may be connected to the LAN 125 through a network interface or adapter in the communications module 109. When used in a WAN networking environment, computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
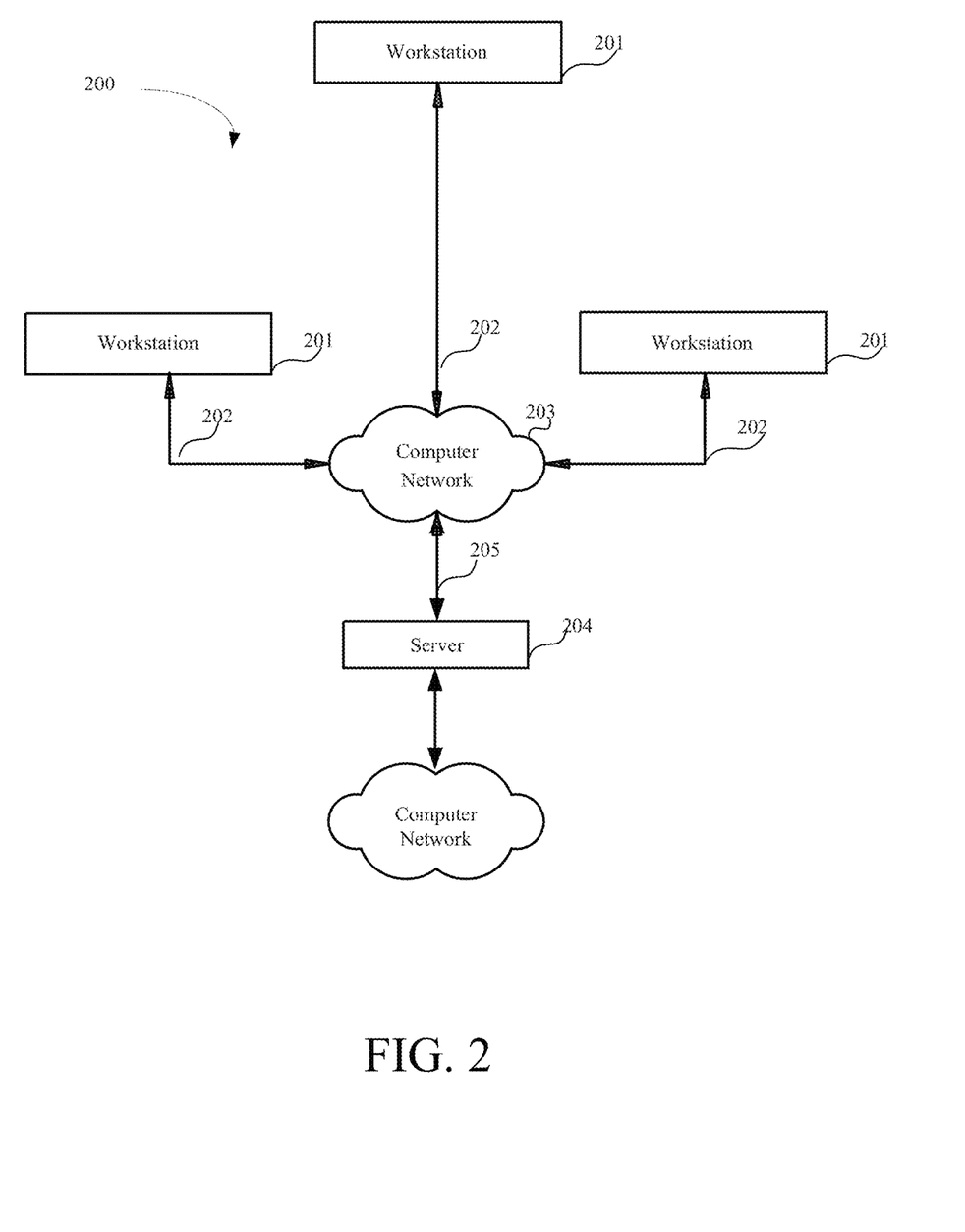
FIG. 2 depicts an illustrative block diagram of workstations and servers that may be used to implement the processes and functions of certain aspects of the present disclosure in accordance with example embodiments.

Referring to FIG. 2, an illustrative system 200 for implementing example embodiments according to the present disclosure is shown. As illustrated, system 200 may include one or more workstation computers 201. A workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Deployment of applications and infrastructure components (e.g., servers) can be a cumbersome task. Conventionally, applications and servers are deployed manually.

Example embodiments provided herein use one or more stencils for deploying and managing the lifecycle (e.g., deployment, changing, managing, upgrading, decommissioning, and the like) of at least one of an application, a server, and other infrastructure components. A stencil may provide configuration information for deploying at least one of the application, the server, and other infrastructure components. Subsequent to stencil creation, the stencil may be reviewed to confirm that it can be used to deploy at least one of the application and the server as expected. After being reviewed, the stencil may be reusable by other users. Rather than having to create a new stencil, other users may search existing stencils to at least one of use and modify an existing stencil to expedite deployment of another application, server, and other infrastructure components.

Figure 3:
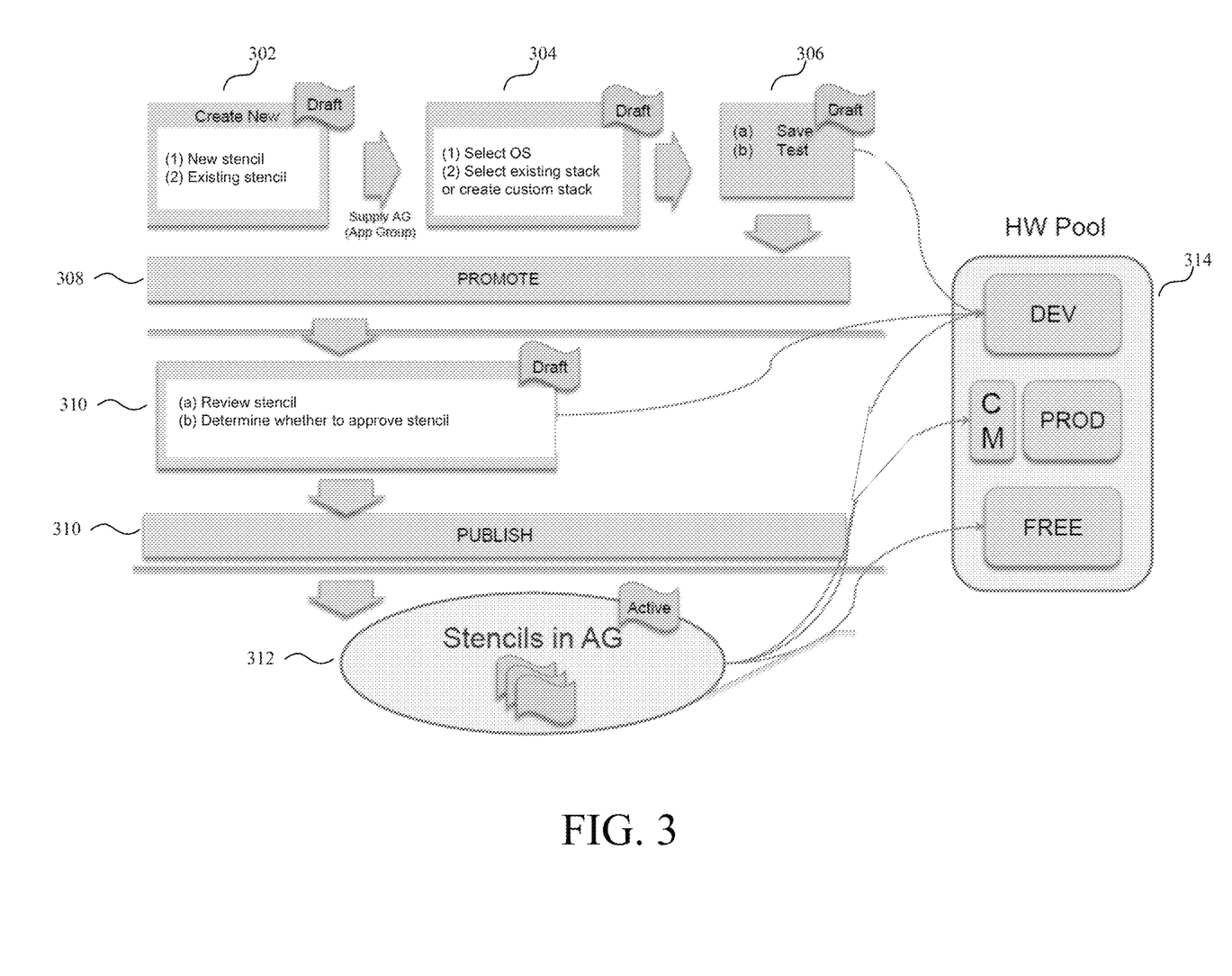
FIG. 3 illustrates an example stencil creation flow diagram in accordance with example embodiments.

FIG. 3 illustrates an example stencil creation flow diagram in accordance with example embodiments. Initially, in block 302, computing device 101 may present a graphical user interface permitting a user to create a stencil. A stencil may include information for configuring an application and/or hardware of a server or infrastructure component. A stencil may also be used to provide common configuration information to multiple servers and/or infrastructure components. To facilitate stencil creation, computing device 101 may look-up resource pools to determine appropriate resources.

Two examples of a stencil are a database stencil and a webserver stencil. A database stencil may be used to configure a server to implement the server as a database server. In an example, the database stencil may specify (1) a server type, (2) memory, storage, and processing requirements of the database server, (3) a network location of where the database server is to obtain software, (4) how to install the software, (5) configuration points in the software, and (6) runtime requirements. Computing device 101 may forward the database stencil to the server, and computing device 101 and server may interact to determine whether server can meet the requirements of the database stencil. If the server is unable to meet the requirements, computing device 101 may forward the database stencil to a different server. If able to meet the requirement, server may process the configuration information from the database stencil to configure the server as a database server.

In another example of a stencil, a webserver stencil may specify (1) processing requirements, (2) a network location of where a server is to obtain software, (3) how to install the software, and (4) where to obtain data. Similar to the example above, computing device 101 may forward the webserver stencil to a server in an attempt to configure the server as a webserver.

Referring again to block 302 of FIG. 3, the user may create a completely new stencil (e.g., not based on an existing stencil) or may modify an existing stencil. For example, computing device 101 may provide the user with a listing of existing stencils and the option to create a completely new stencil. The user may also associate an application group with the stencil, as well as a "draft" tag signifying that the stencil has not yet been approved for deployment. With reference to block 304, computing device 101 may present a graphical user interface permitting a user to select an operating system (OS) and at least one stack for the stencil. The user may select from one of multiple operating systems to use.

A stack may be a collection of elements grouped for a specific function or convenience. Stacks may have authors, group ownership, and can be versioned. Two examples of stack classes are an S-Stack and a C-Stack. An S-Stack may only contain elements. A C-Stack may contain elements as well as one or more S-Stacks. Types of stacks may include an OS Stack, a Public Stack, and a Custom stack. The OS Stack may be available to at least some or all users, and may include an OS Image and a default system configuration. A designer of the OS Stack may manage the OS Stack. A public stack may be available to at least some or all users, include a default bucket, and may specify public stack specific to a hardware profile. The default bucket may include a default setup for various types of applications, hardware, or other resources. Examples include a default setup of a database server, a webserver, a middleware server, standard security settings, high security settings, and the like. The hardware profile may define appropriate computing hardware or resource specifications (e.g., CPU, RAM, speed, and the like). A Public Stack Designer may manage the public stack. A custom stack may only be available for use by an application team (app team), and may contain configuration elements that provide further tuning/customization. A custom stack designer within the app team may manage the custom stack.

Figure 4:
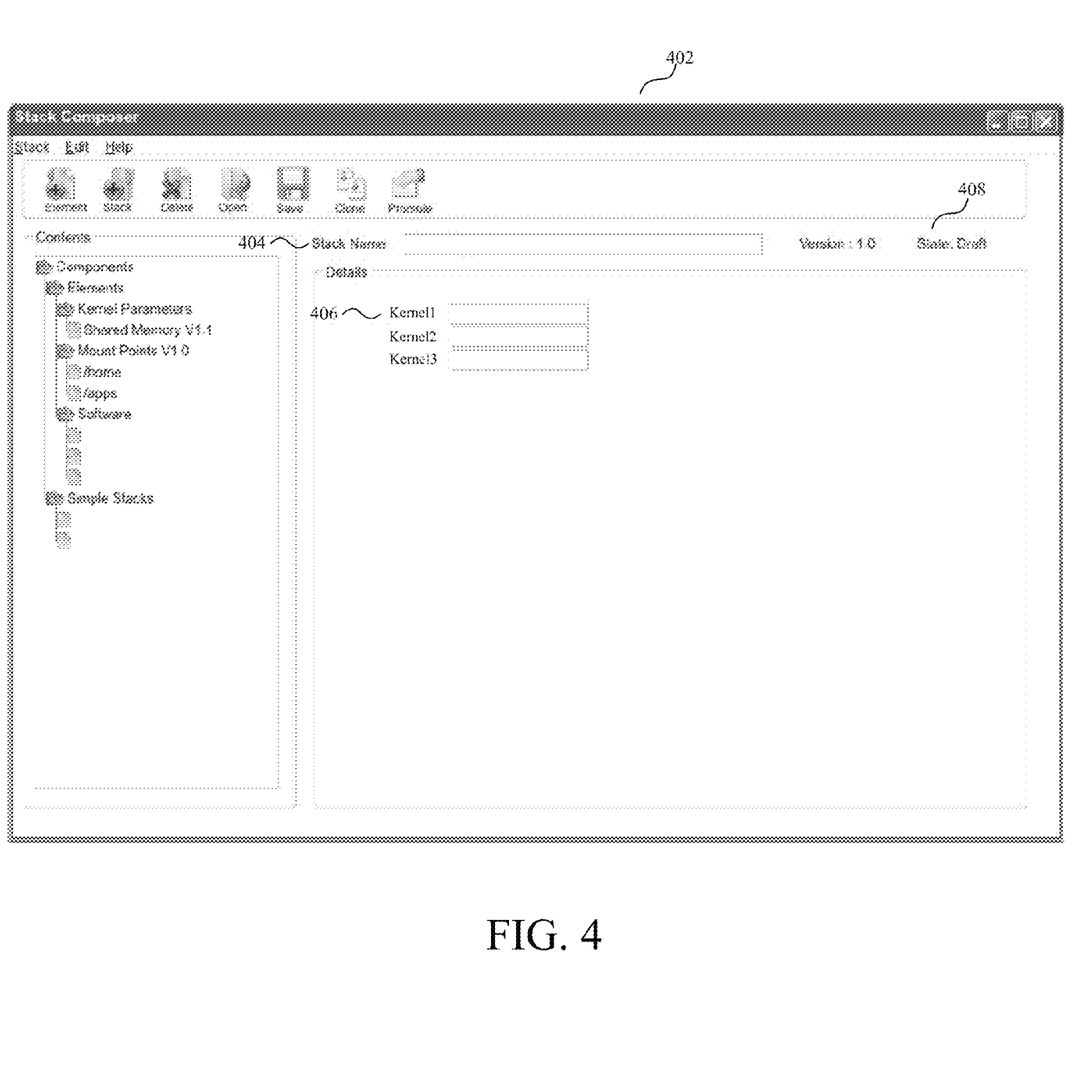
FIG. 4 illustrates an example graphical user interface for composing a stack in accordance with example embodiments.

FIG. 4 illustrates an example graphical user interface 402 for composing a stack in accordance with example embodiments. In an example, a user may use field 404 to provide a name of a stack and field 406 may list one or more elements (e.g., an element named "Kernel1," "Kernel2," or "Kernel3") included in the stack. Tag 408 may list a current state of a stack. In FIG. 4, tag 408 indicates that the stack is in draft. For example, an operating system stack and public default setup stack author may selectively allow settings to be overwritten by custom stacks if specified or to identify certain parameters as being unchangeable. In other examples, the order of parameter overwrites may be customizable. Composing stacks in such a manner may provide for layer based deployment and configuration management. For example, any layer can be switched out during operations for flexibility and using known states.

Figure 5:
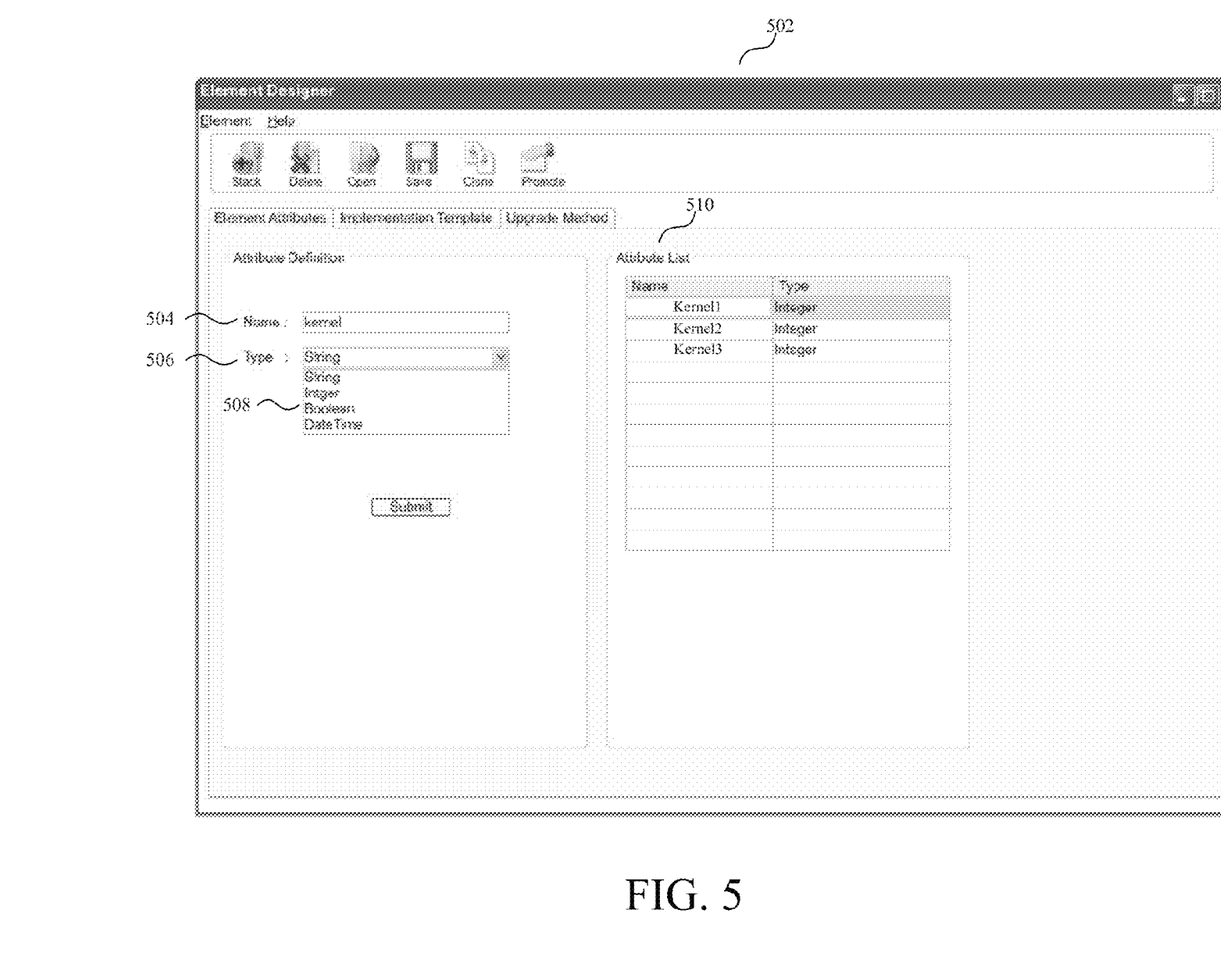
FIG. 5 illustrates an example graphical user interface for composing an element in accordance with example embodiments.

An element may be a lowest building block of configuration information. An element may have many types (e.g., osimage, kernelparams, files, software, mount points, string, integer, Boolean, DateTime, and the like), contain attributes holding configuration values specific to that element type, and provide method(s) of implementation. In some examples, elements may be versioned to ensure re-playability. For example, a user upgrading a stack may be given the opportunity to upgrade elements when upgrading a stencil to a newer version. For example, when upgrading elements, a version of a stack may be automatically changed from a previous version to the new version. In some instances, each element may be associated to an operating system (OS) release. In an example, an element may indicate whether one or more of a service restarts (svcrestart), reboot, or rebuild is required if a configuration is applied to a server. Each element may provide execution dependencies based on other elements and may allow for the ordering of execution steps in an arbitrary or a dependent manner. A designer may manage elements, and an element reviewer may approve new versions of elements for release to an application group. FIG. 5 illustrates an example graphical user interface 502 for composing an element in accordance with example embodiments. In an example, a user may be able to provide a name of an element (e.g., an element named "Kernel1," "Kernel2," or "Kernel3") in field 504 and select a type 506 of an element from a drop down menu 508. Example types include a string type, an integer type, a Boolean type, and a Date Time type. An attribute list 510 may include a listing of names of previously created elements and types of the associated elements.

With reference again to FIG. 3, the stencil may be associated with a host or a group of hosts, and this association may be referred to as tagging. The user who designed the stencil may save the new stencil or submit the new stencil for testing, as shown in block 306. Submitting a stencil for testing may be referred to as promotion, as shown in block 308.

In block 310, a stencil reviewer may review the promoted stencil. During testing, the reviewer have the ability to deploy the stencil into a test zone to validate the outcome. If any issues are identified, the reviewer may communicate the issues, via, e.g., computing device 101, to the stencil creator and may propose any available solutions. If no issues are identified or if a stencil is modified as proposed, the reviewer may via, e.g., computing device 101, publish the new stencil, as shown in block 310. Publishing may involve making the new stencil available for use by the stencil creator, as well as other users or a select group of users. For example, only users who are members of a particular application group may be able to use a stencil. A tag of a published stencil may indicate that the stencil is active and may be used to deploy an application, a server, or other infrastructure components. In some instances, published stencils may be versioned and immutable to provide for reproducibility.

Once a stencil has been approved, other users may copy the stencil and/or modify the stencil to their liking. For example, in block 312, stencils in application group (AG) may be used by other members of the AG. A stencil may limit its use only to members of the AG, to one or more other AGs, or to all users. A stencil may have one or more authors, group ownership, and a lifecycle. A stencil may be deprecated (e.g., removed, made obsolete by a higher version, and the like). When stencil is deprecated, the stencil no longer is taggable unless with authorization (e.g., to allow replay).

Block 314 is an illustration of an Infrastructure Resource Pool available for an application to be deployed. In some examples, the Infrastructure Resource Pool may be hardware (HW) Pool or an Infrastructure Pool. The Infrastructure Resource Pool may contain servers, computing devices, storage devices, network devices, and the like. Groupings or sub-pools may be established to delineate specifications (e.g., standard, premium, platinum specifications with different cost structure) or authority of ownership (e.g., based on businesses such as, for example, Global Markets, Wholesale Banks, and the like). Sub-pools may be used to delineate other appropriate demarcations such as development, test zones, production zones or other specialized zones. As seen in FIG. 3, block 314 may include a development zone, a change management (CM) zone, a production zone, and a free zone (e.g., use for a predetermined amount of time for nominal or no cost).

A stencil may have multiple modes. A stencil may be in a draft mode after being created and prior to being reviewed. When in a draft mode, a reviewer may tag and test the stencil. A stencil is in an active mode subsequent to being approved by a reviewer. Stencils in active mode may be used by the creating user as well as other users to deploy a server, an application, or other infrastructure components. A stencil is in a deprecated mode upon being removed or made obsolete by a higher version. When in the deprecated mode, a user is unable to access the stencil unless authorized.

Figure 6:
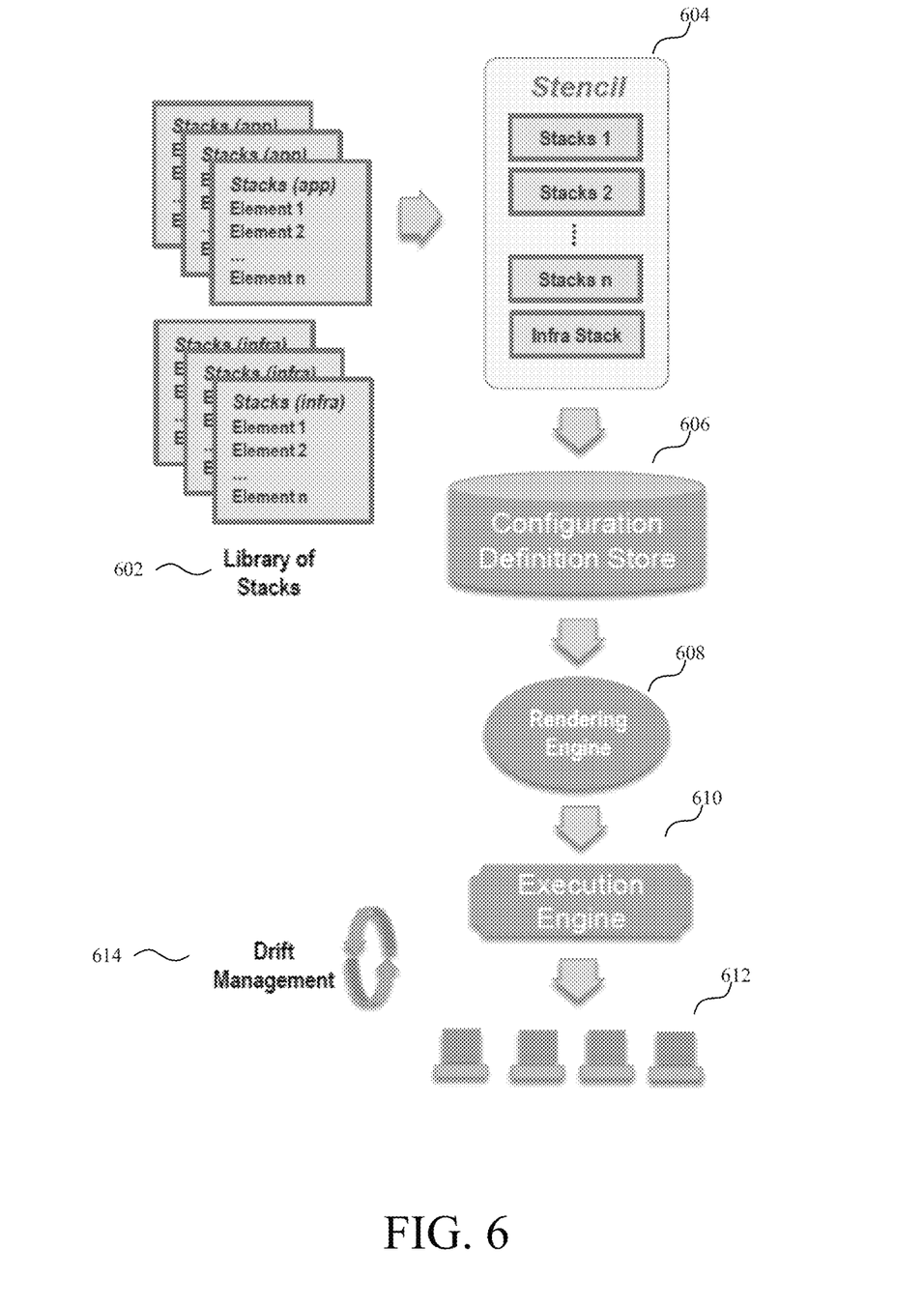
FIG. 6 illustrates an example flow chart and component diagram for utilizing one or more stencils in accordance with example embodiments.

FIG. 6 illustrates an example flow chart and component diagram for utilizing one or more stencils in accordance with example embodiments. In an example, a stencil may be used to initially configure infrastructure resources for a particular purpose or to update a previously configured infrastructure resources. Examples infrastructure resources may include one or more of virtual machines, physical machines, software, hardware, storage, and the like. When deploying a stencil, computing device 101 may access a library of stacks 602 stored locally or remotely and present available stacks to a user for selection via, for example, a graphical user interface. A user may select one or more stacks, and computing device 101 may create a stencil 604 including the selected stacks and may store stencil in configuration definition store 606.

Infra stacks may be used to configure and deploy infrastructure components used by an application. Infra stacks may be contrasted with custom or application stacks that manage configurations of the application. Infra stacks may abstract infrastructure implementation details from application owners and allow proper infrastructure practices to be followed.

A rendering engine 608 may submit stencil 604 to an execution engine 610 to create an application and to configure one or more servers 612 using stencil 604. Rendering engine 608 may translate the intent of the stencils into executable instructions that execution engine 610 can implement to deploy the application. In some examples, execution engine 610 may be separate from the stencils 604 so that execution engine 610 can be upgraded/replaced without the need to change any definitions of the stencils or other configuration definitions. Instead, rendering engine 608 may be replaced and/or updated to provide appropriate executable instructions that execution engine 610 can process.

Drift management 614 may monitor for configuration drifts. In an example, drift management 614 may constantly, periodically, or aperiodically monitor deployed application/infrastructure for any configuration drifts (e.g., when a certain configuration was modified without authorization). Such 'drifts' may result in an alert being generated and/or the configuration being automatically reverted back to conform to the stencil. Such reversion action can be customized to run only during certain time periods, or be temporary suspended.

Figure 7:
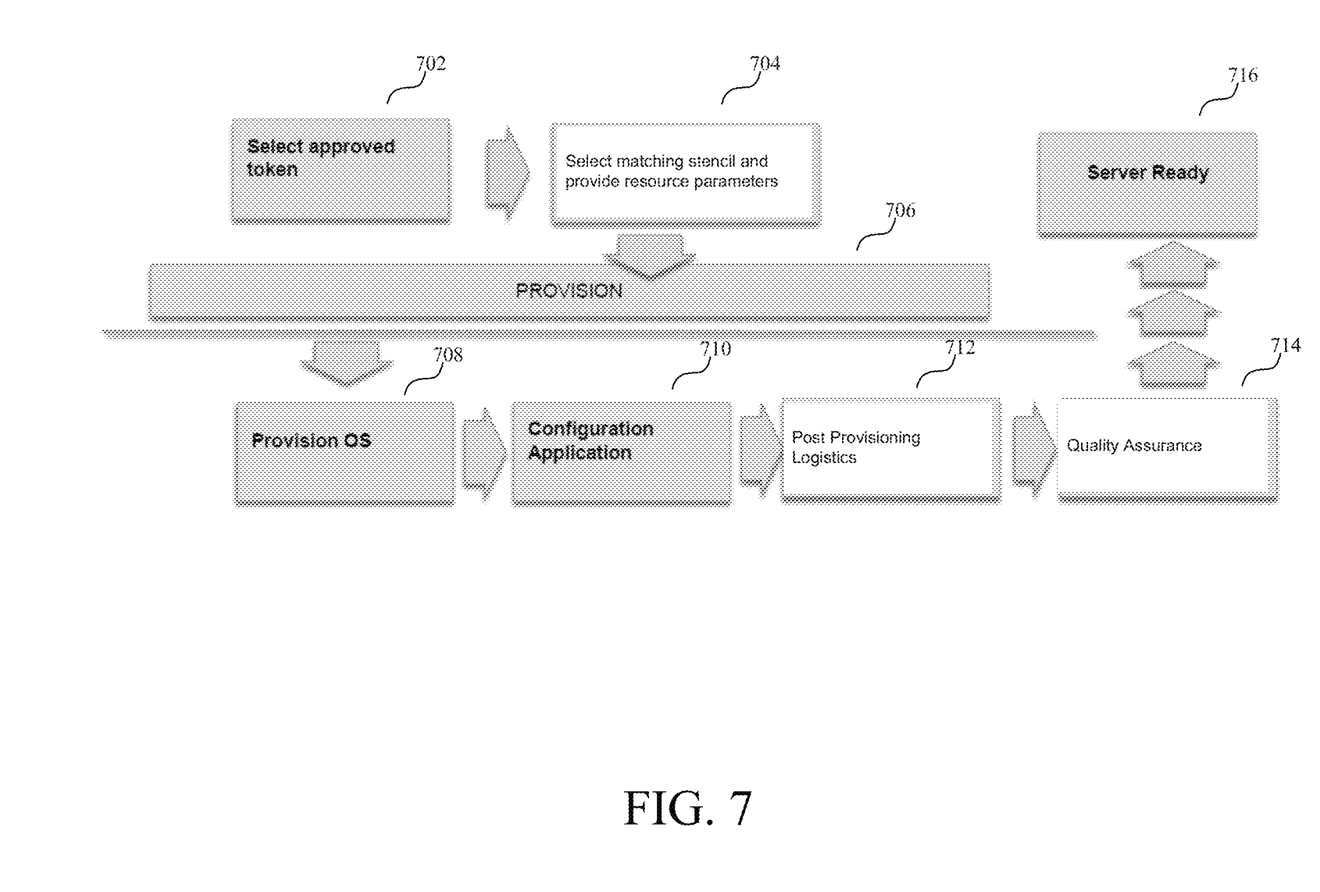
FIG. 7 illustrates an example flow chart of stencil tagging and provisioning/deployment in accordance with example embodiments.

Stencils may be tagged to a server or group of servers. The action of tagging may involve deploying an application and infrastructure as defined in a stencil. Retagging may involve modifying deployed application/infrastructure according to the new stencil being tagged to a particular application and/or server. FIG. 7 illustrates an example flow chart of stencil tagging and provisioning/deployment in accordance with example embodiments. A stencil may include a tag signifying whether the stencil has been tested and approved for deployment. Example tags include, for example, "draft" for a stencil that has not yet been reviewed, "ready for testing" for a stencil that has been sent for review but has not yet been tested, and "approved" for a stencil that has been tested and approved.

In step 702, computing device 102 may receive a selection from a configuration operator or other user of an approved token. A token is used as deployment "currency". When an application owner requests deployment of one or more applications, a choice is made on the types of infrastructure needed (e.g., servers, network, storage etc) and the associated cost components. When such requests are approved, a token is granted so it can be used as a currency by the application owner to deploy their application. When a deployment is made, the value of the token is debited to reflect the appropriate consumption that has happened.

In step 704, computing device 102 may select a stencil matching the token and identify parameters. In some examples, a token may have an implicit monetary value based upon the infrastructure specifications requested. A stencil or a request made with a certain infrastructure requirement may be matched against the token to ensure specifications and monetary is within range.

In step 706, computing device 102 may provision the stencil. In step 708, execution engine 610 may provision an operating system based on the stencil. In step 710, execution engine 610 may configure an application based on the stencil and, in step 712, may post provisioning logistics. Post provisioning logistics may encompass registration of monitoring, systems of records updates, financial cost registration, and the like. These may interface via an application programming interface (API) with various other systems. In some examples, post provisioning logistics may include monitoring the application and a runbook, as well as backing up the application. In step 714, execution engine 610 may perform quality assurance on the application and may configure a server, in step 716, to include the application.

Figure 8:
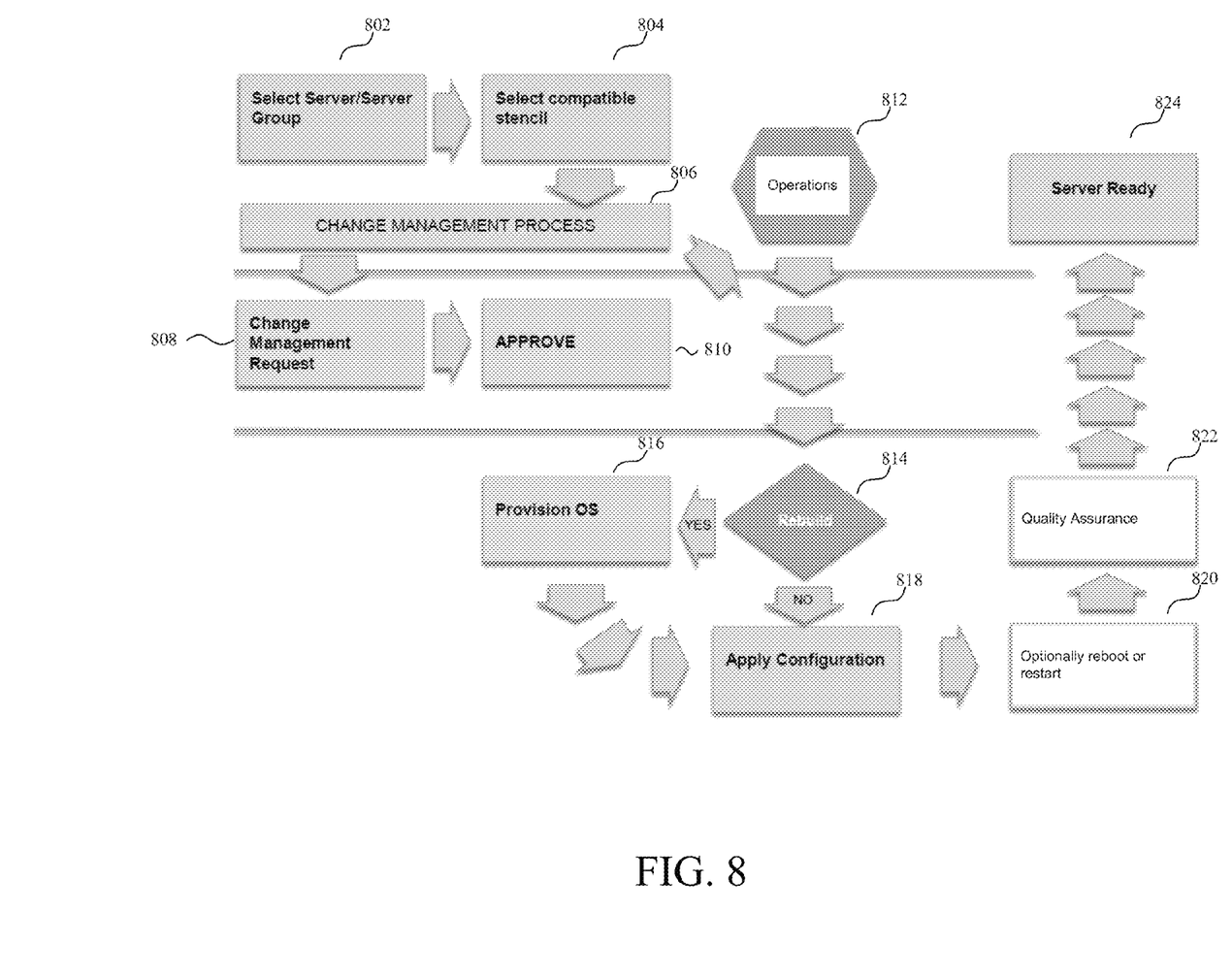
FIG. 8 illustrates an example flow chart of stencil retagging and change management processes and controls in accordance with example embodiments.

FIG. 8 illustrates an example flow chart of stencil retagging and change management processes and controls in accordance with example embodiments. In step 802, computing device 101 may receive a selection of a server or server group from a configuration operator or other user. For example, user may identify at least one server on which to use a stencil for deploying an application. In step 804, computing device 101 may receive a selection of a compatible stencil. A compatible stencil may have stencils for which capable resources are available. For examples, a stencil may have certain resource specifications and may not be suitable for all resources. For example, if a stencil requires storage area network (SAN) storage, computing device 101 may only display those resources with hardware capable of providing the SAN storage specified by the stencil.

In step 806, computing device 101 may receive an instruction to change a management process. Such changes may be subjected to change management practices of the organization and procedures may vary for different types of servers (e.g., Development vs. Production) or different businesses (e.g., Capital Markets vs. Credit Card business). The system may communicate with change management software via, for example, application programming interfaces (APIs) for rule enforcement.

In steps 808 and 810, a change management approver may receive and approve a change management request. In step 812, computing device 101 may inform the configuration operator of operations to be performed for stencil deployment (e.g., rebuild, reboot, restart service) and of a maintenance window. If accepted, computing device 101 may instruct execution engine to perform the change. In step 814, execution engine may determine whether to rebuild the server. If rebuilt, flow chart may proceed to step 816 where execution engine 610 provisions an operating system and continues to step 818. Returning to step 814, if the stencil is not rebuilt, the flow chart may proceed to step 818. In step 818, execution engine 610 may apply a configuration to one or more servers. In step 820, execution engine optionally may instruct one or more of the servers to at least one of reboot and restart. In step 822, execution engine may perform quality assurance on the servers. In step 844, execution engine may inform computing device 101 when the one or more servers are ready.

Figure 9A:
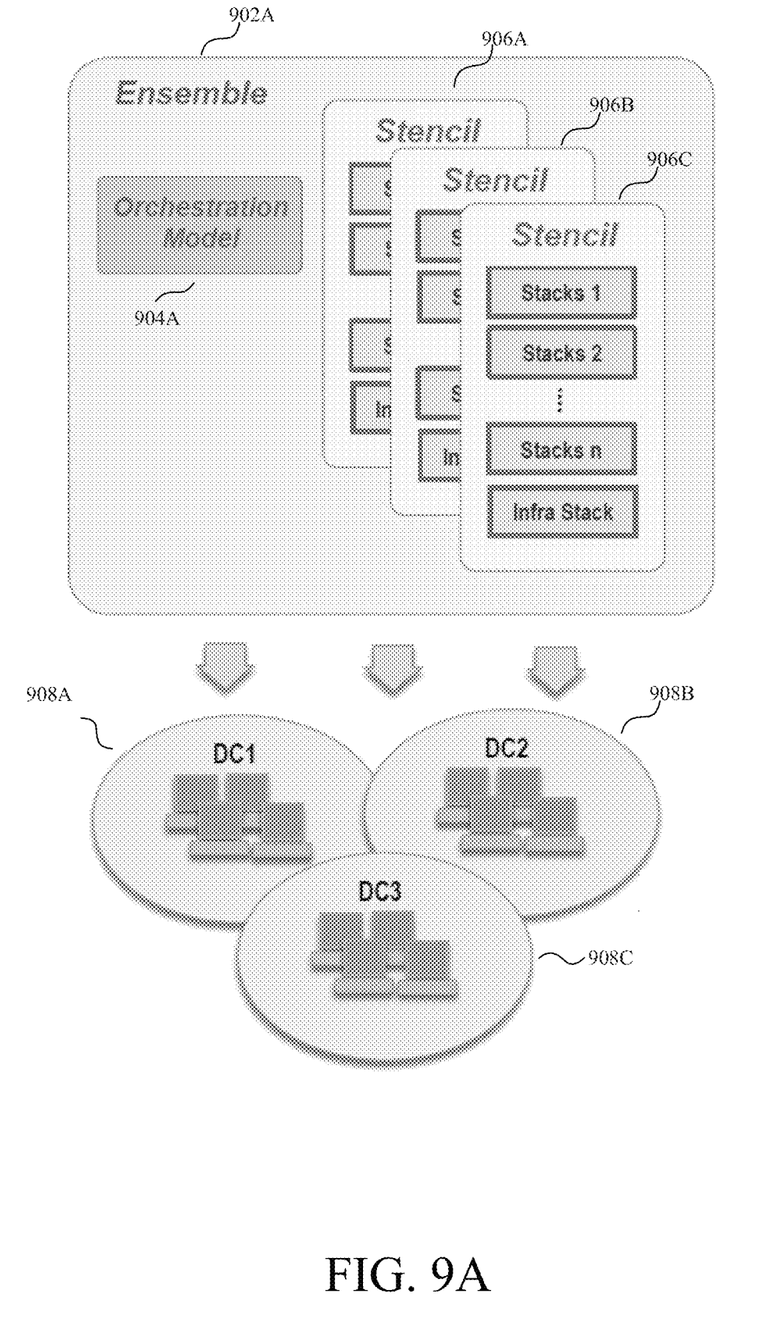
FIG. 9A illustrates an example of an ensemble in accordance with example embodiments.

In some instances, an ensemble including multiple stencils may be used to define an application environment within one or more data centers. Referring to FIG. 9A an ensemble 902A may be a definition of an application environment. Ensemble 902A may include an encapsulation of multiple stencils 906A-C and an orchestration model 904A. Computing device 101 may create ensemble 902A based on selections of stencils 906A-C and orchestration model 904A received from a user. Stencils 906A-C may each describe a different component of an application (e.g., web, middleware, database, and the like). Orchestration model 904A may include an affinity and constraint model (e.g., 2 database servers located in different regions, web and middleware servers reside on same virtual local area network, and the like). Orchestration Model 904A may place requirements constraints (e.g., latency requirements, resiliency requirements, server A must be on same network as Server B, execution order, and the like). Ensemble 902A may enable a configuration operator to define an application environment on one or more data centers. For example, an entire application suite can then be deployed using ensemble 902A. An example definition of an application environment includes three datacenters 908A-C in different regions each configured as a webserver, with two load-balanced messaging servers and two back-end database servers in an active/passive failover setup. Each datacenter 908A-C may include one or more servers and/or other infrastructure components. Ensemble 902A may include a "rejuvenate" option allowing applications to automatically heal when resources fail (e.g. entire datacenter 908A is unavailable) and there are available spare resources at another datacenter that can implement the application environment.

Figure 9B:
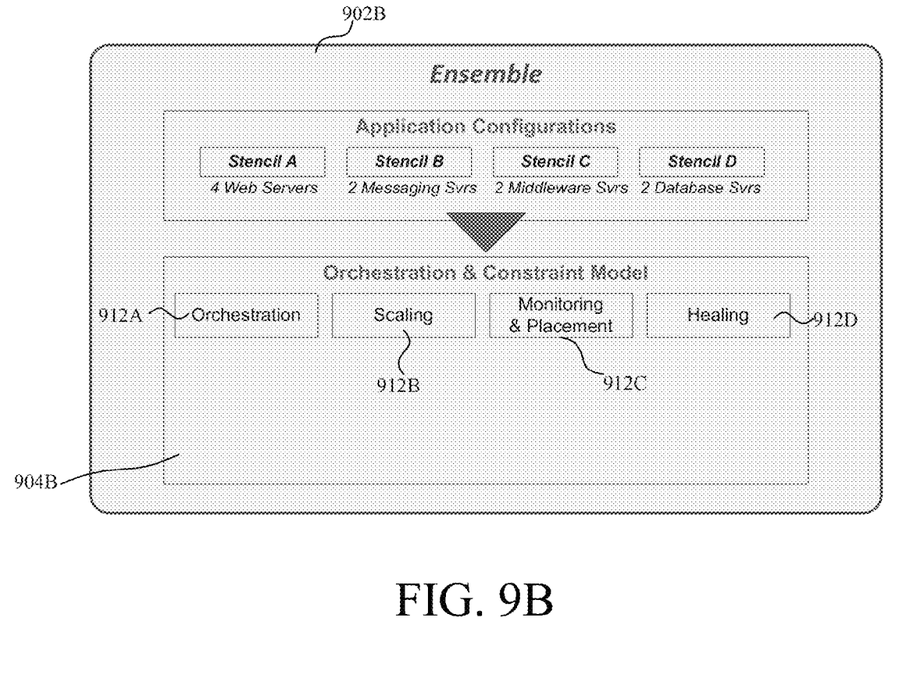
FIG. 9B illustrates another example of an ensemble in accordance with example embodiments.

FIG. 9B is depicts another exemplary ensemble 902B. In this example, the ensemble 902B may contain stencils A-D. The stencils A-D can be configured for deploying of applications and servers in accordance with the exemplary embodiments discussed herein. In this example, stencils A-D can be used to launch 10 servers total for various operations. In this example, stencil A is used to configure four web servers, stencil B is configured to launch 2 messaging servers, stencil C is configured to launch two middleware servers, and stencil D is configured to launch two database servers. Other operations and numbers of servers are also contemplated.

In addition, the ensemble 902B can contain an orchestration and constraint model 904B. With the orchestration and constraint model 904B various conditions can be configured for deploying and adjusting the servers during use. For example, the orchestration and constraint model 904B can provide rules or parameters 912A-D for how the servers in stencils A-D are deployed into various compute zones. An orchestration parameter 912A can be set where webserver A is deployed first, then webservers B, C, and D are deployed next in subsequent fashion. The orchestration parameter can also instruct that all database servers, messaging severs, and middleware servers are deployed before the webservers. A scaling parameter 912B can also be set, which can add two more units when the webservers' 30-day load average is above 90%. A monitoring and placement parameter 912C can also be set in the orchestration and constraint model 904B. For example, the monitoring and placement parameter 912C can require that two database servers are separated by at least 80 kilometers and can require that the latency between the database servers and the messaging servers be less than 20 microseconds. Various monitoring can be set up within the system to automatically deploy more capacity as needed and to determine if certain failures caused degraded states. In addition, a healing parameter 912D can be set such that when the system is operating in a degraded state, the healing function will determine what if any additional resources are needed to be deployed to restore optimum running state.

Figure 9C:
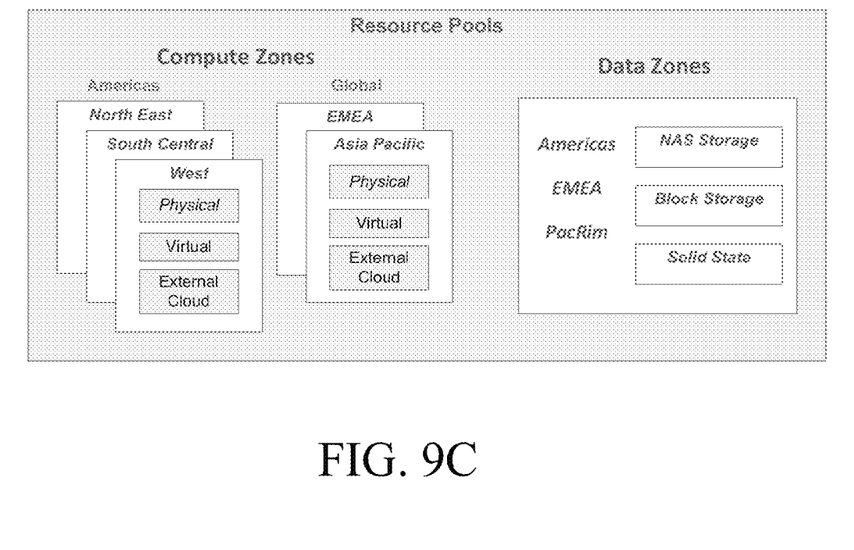
FIG. 9C illustrates a schematic of resource pools in accordance with example embodiments.

FIG. 9C illustrates various resource pools, which include compute zones and data zones that can be used to implement the servers. The compute zones can be located in any desired location and can include either physical, virtual or external cloud types of compute zones. For example, additional servers may need to be deployed during peak months for business, such as holiday months. In this case, extra capacity will only be necessary for a few months and a pay per use model can be implemented such that new servers will not have to be purchased. In addition any type storage device can be used in the system for the data zones. For example, NAS storage, block storage, or solid state storage can be implemented for the data zones.

Figure 10:
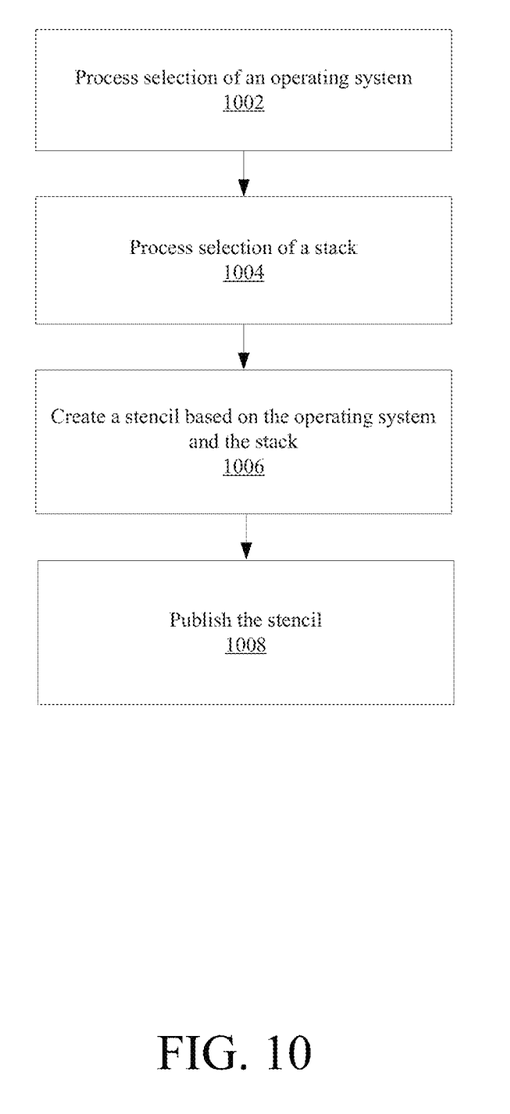
FIG. 10 illustrates an example flow diagram of a method in accordance with example embodiments.

FIG. 10 illustrates an example flow diagram of a method, in accordance with example embodiments. The method may be performed by at least one apparatus such as, for example, a computer, server, or other computational device. For example, the method may be implemented by a single apparatus (e.g., computer) performing the functions of computing device 101. The method also may be implemented using two or more devices (e.g., two or more processors, systems, apparatuses, and the like). The order of the blocks shown in FIG. 10 is an example. The blocks may be arranged in other orders, each function described in each block may be performed one or more times, some blocks may be omitted, and/or additional blocks may be added. The method may begin at block 1002. In block 1002, the method may include processing a selection of an operating system. For example, computing device 101 may receive input via a graphical user interface selecting an operating system. A user may select between one of multiple operating systems.

In block 1004, the method may include processing selection of a stack. In an example, computing device 101 may receive input via a graphical user interface selecting a stack. The stack may have been previously created or may be a custom stack newly created by the user. The stack may be one of multiple classes, such as, for example, a C-Stack or an S-Stack.

In block 1006, the method may include creating a stencil based on the operating system and the stack. In an example, computing device 101 may create a stencil based on the selected operating system and stack. The stack may be one of many stacks, or may be a single stack.

In block 1008, the method may include publishing the stencil. Publishing the stencil may create all or a select group of users to use the stencil for their own deployment purposes. The method may end, may repeat one or more times, or may return to any of the preceding blocks.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

The invention claimed is:

1. An apparatus comprising:
   a graphical user interface;
   at least one processor communicatively coupled to the graphical user interface; and
   at least one memory storing computer readable instructions that, when executed by the at least one processor, cause the apparatus at least to:
   present, to a user via the graphical user interface, a plurality of available operating systems;
   receive a first input comprising a selected operating system, wherein the selected operating system is one of the plurality of available operating systems;
   process selection of the selected operating system;
   present, to the user, a plurality of available stacks accessed from a library of stacks stored in one of a local memory device or a remote memory device, wherein the library of stacks includes at least one S-stack comprising a first plurality of elements and at least one C-stack comprising a second plurality of elements and at least one S-stack;
   receive a second input comprising a selected stack, wherein the selected stack is one of the plurality of available stacks;
   process selection of the selected stack;
   create a stencil based on the selected operating system and the selected stack, wherein the stencil comprises configuration information for a lifecycle of a component;
   publish the stencil to a configuration definition store for use by one or more users;
   receive a selection of the stencil;
   translate, by a rendering engine, the configuration information of the stencil into computer executable instructions; and
   configure, by the execution engine, at least one server based on the computer executable instructions.

2. The apparatus of claim 1, wherein the selected stack is one of a plurality of stacks included in the stencil.

3. The apparatus of claim 1, wherein the selected stack comprises a plurality of elements.

4. The apparatus of claim 1, wherein the computer executable instructions, when executed, cause the apparatus to provide a common configuration to a plurality of servers using the stencil.

5. The apparatus of claim 1, wherein the computer readable instructions, when executed by the at least one processor, cause the apparatus to:
   process a selection of an orchestrator model and of a plurality of stencils;
   generate an ensemble based on the orchestrator model and the plurality of stencils, wherein the ensemble defines an application environment within one or more data centers; and
   deploy the application environment to a plurality of servers within the one or more data centers based on the ensemble.

6. The apparatus of claim 1, wherein the computer executable instructions, when executed, cause the apparatus to apply a tag to the stencil.

7. The apparatus of claim 6, wherein the computer readable instructions, when executed by the at least one processor, cause the apparatus to retag the stencil.

8. A computer-implemented method comprising:
   presenting, to a user via a graphical user interface, a plurality of available operating systems;
   receiving, by the at least one processor, a first input comprising a selected operating system, wherein the selected operating system is one of a plurality of available operating systems;
   processing, by the at least one processor, selection of the selected operating system;
   presenting, to the user, a plurality of available stacks accessed from a library of stacks stored in one of a local memory device or a remote memory device, wherein the library of stacks includes at least one S-stack comprising a first plurality of elements and at least one C-stack comprising a second plurality of elements and at least one S-stack;
   receiving, by the at least one processor, a second input comprising a selected stack, wherein the selected stack is one of a plurality of available;
   processing, by the at least one processor, selection of the selected stack;
   creating, by the at least one processor, a stencil based on the selected operating system and the selected stack, wherein the stencil comprises configuration information for a lifecycle of a component;
   publishing, by the at least one processor, the stencil to a configuration definition store for use by one or more users;
   receiving a selection of the stencil;
   translating, by a rendering engine, the configuration information of the stencil into computer executable instructions; and
   configuring, by the execution engine, at least one server based on the computer executable instructions.

9. The method of claim 8, further comprising providing a common configuration to a plurality of servers using the stencil.

10. The method of claim 8, further comprising:
    processing a selection of an orchestrator model and of a plurality of stencils; and
    generating an ensemble based on the orchestrator model and the plurality of stencils.

11. The method of claim 10, further comprising deploying an application environment to a plurality of servers based on the ensemble.

12. The method of claim 8, further comprising applying a tag to the stencil.

13. The method of claim 12, further comprising retagging the stencil.

14. A non-transitory computer readable medium storing computer readable instructions that, when executed, cause an apparatus at least to:
present, to a user via a graphical user interface, a plurality of available operating systems;
receive a first input comprising a selected operating system, wherein the selected operating system is one of a plurality of available operating systems;
process selection of the selected operating system;
generate an element comprising a selection of one of a plurality of types for the element;
present, to the user, a plurality of available stacks accessed from a library of stacks stored in one of a local memory device or a remote memory device, wherein the library of stacks includes at least one S-stack comprising a first plurality of elements and at least one C-stack comprising a second plurality of elements and at least one S-stack;
receive a second input comprising a selected stack, wherein the selected stack comprises the element, and wherein the selected stack is one of the plurality of available stacks accessed from a library of stacks stored in one of the local memory device or the remote memory;
process selection of the selected stack;
create a stencil based on the selected operating system and the selected stack, wherein the stencil comprises configuration information for a lifecycle of a component; and
publish the stencil to a configuration definition store for use by one or more users;
receive a selection of the stencil;
translate, by a rendering engine, the configuration information of the stencil into executable instructions; and
configure, by the execution engine, at least one server based on the executable instructions.

15. The computer readable medium of claim 14, wherein the computer readable instructions, when executed, cause the apparatus to provide a common configuration to a plurality of servers using the stencil.

16. The computer readable medium of claim 14, wherein the computer readable instructions, when executed, cause the apparatus to:
process a selection of an orchestrator model and of a plurality of stencils;
generate an ensemble based on the orchestrator model and the plurality of stencils; and
deploy an application environment to a plurality of servers based on the ensemble.

17. The computer readable medium of claim 14, wherein the computer readable instructions, when executed, cause the apparatus to apply a tag to the stencil.

* * * * *